Figure 1:
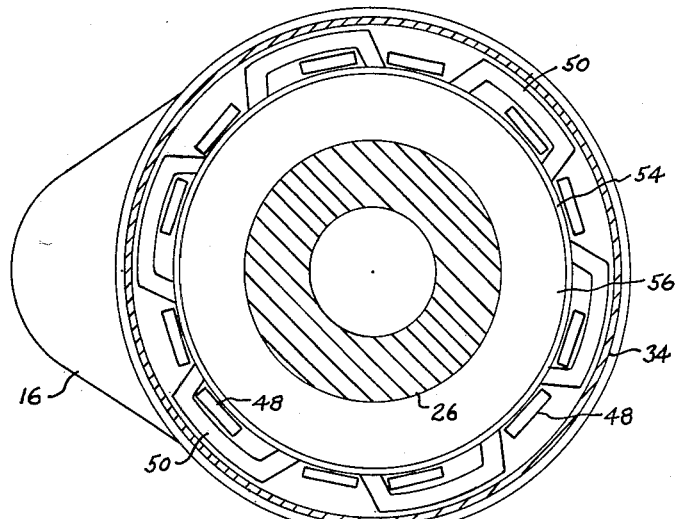

April 27, 1965     E. R. PLASKO     3,180,075

MOTOR CONTROL MEANS

Filed Feb. 21, 1963

INVENTOR.
EMIL R. PLASKO
BY JOHN E. McRAE

United States Patent Office 3,180,075
Patented Apr. 27, 1965

3,180,075
MOTOR CONTROL MEANS
Emil Robert Plasko, Walled Lake, Mich., assignor to American Radiator & Standard Sanitary Corporation, New York, N.Y., a corporation of Delaware
Filed Feb. 21, 1963, Ser. No. 260,156
8 Claims. (Cl. 60—7)

This invention relates to control means for a power device of the type which comprises an electric motor, an output driven member, and a spring means arranged to be progressively loaded as the electric motor moves the output member in one direction from a start position, whereby when the motor is de-energized the spring means is able to reverse the direction of movement of the output member back to the start position.

In power devices of this type speed reduction gearing is provided between the motor and the output member to permit the member to develop sufficient force on the device being operated. During the reverse direction movement by the spring certain of the rotating parts in the speed reduction gearing have relatively high rotary speeds which produce an audible whining or singing action. In some cases such an action is objectionable, as for example in hot water room heating systems wherein the power device is utilized adjacent the room wall to operate a water valve between open and closed positions.

A further objectionable feature of this type of power device resides from the fact that the high speeds attained by the motor and speed reduction gearing cause a substantial shock load to be exerted on the rotating gears when the limit of the reverse direction movement is reached. In order to overcome this last-mentioned disadvantage it is usual practice to provide within the speed reduction gearing a motion-absorbing device such as an overrunning pawl-ratchet mechanism. When such a device is employed the output member can come to an abrupt halt against a fixed stop element while the speed reduction gearing can for a time continue its reverse motion as permitted by the ratchet pawl mechanism.

With the above discussion in mind, it is the principal object of the present invention to provide a power device of the aforementioned electric motor-spring motor type, wherein the speed reduction gearing can have a relatively slow motion during the reverse direction movement so as to reduce noise emission and shock loadings.

A further object is to provide for the aforementioned reduction in shock load without the necessity for utilizing a pawl-ratchet mechanism or other similar overrunning device.

A still further object of the invention is to provide a power device which incorporates a conventional synchronous electric motor and spring return mechanism, and which utilizes only one new component for achieving the aforementioned reduction in noise emission and shock loading.

Other objects of this invention will appear from the following description and appended claims, reference being had to the accompanying drawings forming a part of this specification wherein like reference characters designate corresponding parts in the several views.

Figure 2:
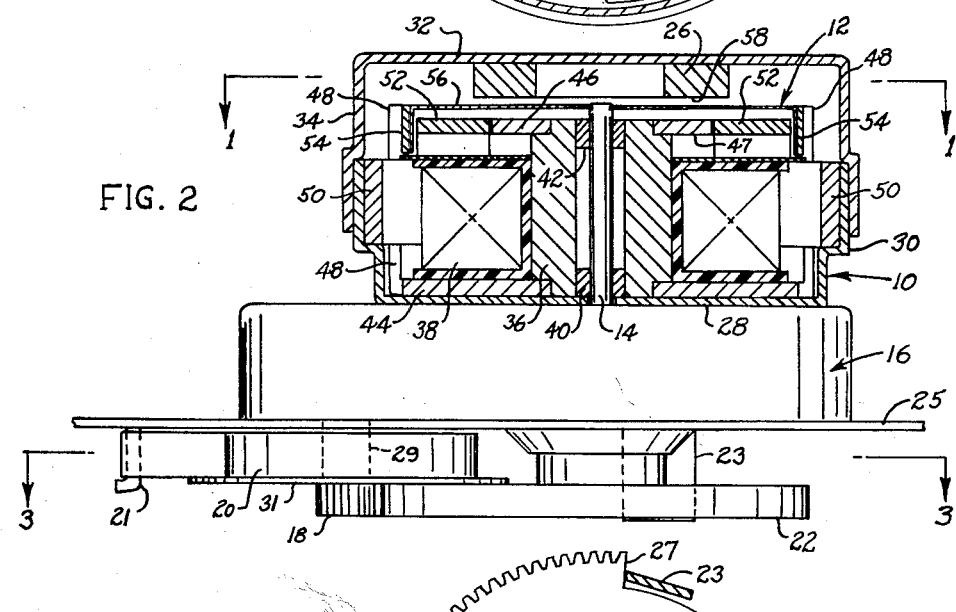
Figure 3:
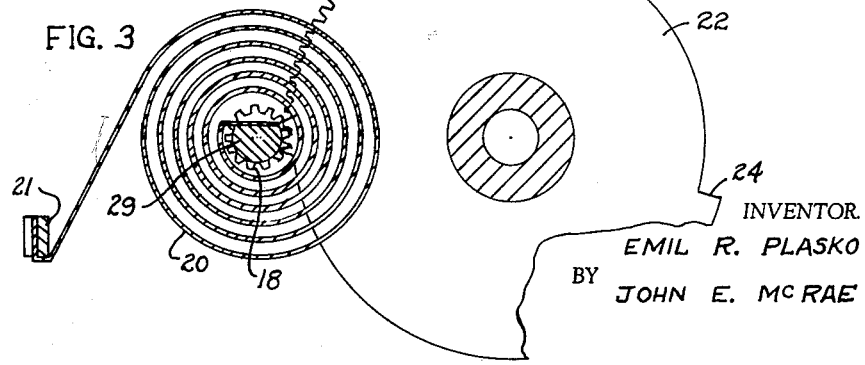

In the drawings:
FIGURE 1 is a sectional view taken on line 1—1 in FIG. 2, and illustrating a power device having features of the invention incorporated therein;
FIG. 2 is an elevational view of the FIG. 1 power device, with parts thereof sectioned; and
FIG. 3 is a sectional view taken along line 3—3 in FIG. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be undersood that the phraseology or terminology employed herein is for the purpose of description and not of limitation.

General operation

There is shown in the drawings a power device which comprises an electric synchronous motor 10 having a rotor 12 which drives a shaft 14, a conventional gear-type speed reduction mechanism 16 which transmits the drive to low speed rotary output gears 18 and 22, and a spiral leaf spring 20 which is progressively loaded while gear 18 is being moved by motor 10 and the reduction gearing. After a prescribed period of operation shoulder 24 on member 22 strikes stop element 23 and motor 10 then takes a stalled energized condition with the output members 18 and 22 prevented from further movement. However when current flow through the motor is interrupted the loaded spring 20 reverses the direction of motion of members 18 and 22, and returns same to their FIG. 3 starting positions. In some instances spring 20 could be replaced by another type storable energy power means such as a raisable -lowerable weight.

The general arrangement of electric motor and storable energy spring return means can be utilized in various different environments, but one of the principal environments now known to me is in room heating arrangements wherein hot water is flowed throgh room heat exchangers. In such heating arrangements the room temperature is regulated by one or more room thermostats which control the opening and closing of water supply valves for the individual heat exchangers. When the illustrated device is utilized in such environments electric motor 10 is elertrically connected with the room thermostat, and output member 22 is mechanically connected with the valve element in the water control valve (not shown).

In operation of such an arrangement, on the call for room heat motor 10 is energized to operate member 22 from its FIG. 3 position in a counterclockwise direction so as to open the water valve; thus output member 22 moves from its FIG. 3 valve-closed position to a valve-open position in which its shoulder 24 abuts against the fixed stop 23. While the room thermostat continues to call for heat the parts remain in their valve-open positions with motor 10 energized but stalled. Upon satisfaction of the room thermostat motor 10 is de-energized so that loaded spring 20 can return output member 22 to its FIG. 3 valve-closed position. The associated elements such as gear 18, the reduction gearing 16, the rotor 12 and non-illustrated valve element are also moved by the spring during this period.

The general arrangement thus far described is old prior to this invention, and this invention is concerned primarily with means for reducing the speed of the output member 22 during the reverse movement, i.e., when the output member is being driven by spring 20. In the illustrated embodiment the speed-reducing means comprises merely one new component, namely an annular permanent magnet 26. Before describing the function of this magnet however a brief reference will be made to the general construction of motor 10, since it enters into the operation of the magnet.

Electric motor 10

In essence the illustrated motor 10 is similar to the motor shown and comprehensively described in U.S. Patent 2,298,373. As shown herein the motor includes a generally cup-shaped casing element 28 having an annular side wall 30, and a second cup-shaped cover element 32 having an annular side wall 34, said casing element and cover element being suitably telescoped one within the other to provide a housing for the motor parts.

The motor parts include a magnetically permeable core member 36 which extends within a field coil 38 and which is provided with sleeve bearings 40 and 42 for journaling the rotary shaft 14. Arranged adjacent opposite ends of core 36 are two magnetically permeable pole pieces 44 and 46. Pole piece 44 is provided with twelve axially extending pole elements 48 which extend about the periphery of the field coil 38 and which cooperate with a similar number of radially extending pole elements extending from the central annular disc portion 47 of pole piece 46. As shown in FIG. 1, alternate ones of the pole elements 48 are partially surrounded by the electrically conductive shading members 50, preferably of copper. Similarly, alternate ones of the radial pole elements on piece 46 are partially surrounded by the electrically conductive shading members 52, all as better shown in the aforementioned patent.

The outer ends of the pole elements on pole pieces 46 are spaced inwardly from the free end portions of the pole elements 48 to define gaps or breaks in the magnetic circuit produced by coil 38. Arranged within the gaps is an axially extending ring 54 of magnetically permeable material, preferably hardened steel. As shown in FIG. 1, ring 54 is carried on the axially extending flange of the rotor 12. As this motor is conventionally constructed the rotor comprises a radial disc portion 56 formed of aluminum, which is an electrically conductive but non-magnetic material. The conductive character of the material is advantageously utilized in the practice of the present invention.

In the normal conventional operation of motor 10, when field coil 38 is energized a magnetic flux is produced in the shaded and unshaded pole pieces. Due to the shading the flux is a rotating magnetic flux which pulls the steel rotor portion 54 along at synchronous speed. The rotor operates at a constant synchronized speed which is dependent on the frequency of the supplied alternating current and the number of poles in the motor. With a current frequency of 60 cycles per second, the illustrated motor will operate at 600 r.p.m.

Spring motor 20

In the illustrated embodiment spring 20 has its outer end suitably anchored on an arm 21 which is struck down from the supporting plate 25. In this embodiment plate 25 also supports the other parts of the assembly, including reduction gearing 16 and motor 10.

The inner end of spring 20 is suitably affixed to the shaft portion 29 of gear 18, which is the output gear for reduction unit 16. Thus, during clockwise movement of gear 18 the spring is wound up to a loaded condition wherein it can reverse the motion of gear 18 and the meshing sector gear 22. As shown in FIG. 3, the sector gear is provided with two spaced shoulders 24 and 27 which cooperate with the fixed stop element 23 to limit the gear movement in opposite directions. To insure alignment of the spring 20 convolutions the shaft 29 may have a disc 31 loosely carried thereon; for purposes of showing the gear engagement the disc has been omitted from FIG. 3.

In one commercially available motor-gear arrangement of the FIG. 2 type rotor 12 operates at 600 r.p.m., and member 22 is operated thereby at a speed of approximately one-fourth r.p.m.; i.e., member 22 moves approximately one-fourth revolution from its FIG. 3 position in a matter of about one minute. With such rotational speeds the speed reduction gearing has a barely audible noise emission which is not objectionable in hot water room heating systems. With this conventional arrangement when motor 10 is de-energized spring 20 effects reverse movement of member 22 back to its illustrated FIG. 3 position in about fifteen seconds. The speed of each moving part is therefore about four times the speed during the forward movement. At the higher speeds the reduction gearing 16 has a tendency to produce an objectionable audible whine or sing, particularly when the gearing has had its lubricant supply depleted by a period of service. Additionally the higher reverse motion speeds tend to set up an undue shock load on the gears, as when shoulder 27 strikes fixed stop element 23. In order to reduce the effects of this shock load on the gearing it has been customary to provide in the gearing a slipping or overrunning clutch which allows the gearing to continue to rotate for a short period of time after shoulder 27 has contacted stop 23.

The invention

The present invention seeks to eliminate the cost of the overrunning clutch, and the objectionable whine of gearing 16 during the spring-driving period. The means I have chosen to accomplish this object comprises a permanent magnet 26 which is suitably affixed to the underside of cover element 32, as by cement or the like. The magnet is preferably annular, and in its affixed position has its face 58 located closely adjacent the upper face of the rotor aluminum disc portion 56. Also, the magnet location is chosen so that face 58 is in axial alignment with and closely adjacent the annular portion of pole piece 46. With such an arrangement the magnetic flux created by permanent magnet 26 passes through the aluminum disc and pole piece 46. The passage of this magnetic flux while disc 56 is rotating at high speed causes eddy currents to be formed in the disc, and the disc to be thus retarded in its movement by the known eddy current braking principle.

Preferably the permanent magnet is maintained as an effective but small size item by magnetizing it only on its face 58, and by carrying out the magnetizing operation using a plurality of induction coils so as to form a plurality of north and south poles. In one case the magnet was provided with two north and two south poles. In operation of the illustrated device the inclusion of magnet 26 in the system increases the reverse movement time from the aforementioned fifteen seconds to a total time of about thirty seconds, i.e., the rotor and other elements operate at about one-half the speed as compared to the speed when magnet 26 is not present. In observing the performance of the device it has been noted that during the start of the reverse movement disc 56 has a fairly high speed but that it slows down a short time after the start of the movement. This indicates that some time is required before the eddy currents can form and exert the braking action on the rotor. When the reverse movement is terminated by engagement of shoulder 27 with stop element 23 the rotor and reduction gearing are operating at appreciably lower speeds than when the permanent magnet is not employed.

It is found that the reduced operating speeds so reduce the shock loads on the gearing as to eliminate the necessity for the aforementioned overrunning clutch. Also, the reduced speeds appreciably cut down on the audible whine or sing of the gearing which is objectionable in some situations as aforementioned. It will be evident that the reduction in shock load and audible noise is accomplished at very little added cost. In fact the elimination of the overrunning clutch can substantially balance the added cost of the permanent magnet.

It might be thought that permanent magnet 26 would have an adverse effect on the torque of member 22 during the forward movement, i.e., when the output member is being driven by electric motor 10. However, observations indicate that the output member torque is substantially unaffected by the presence of magnet 26. Thus, any reduction in torque is barely, if at all, measurable, being in any case no more than a very few percent.

As one reason for the lack of torque reduction it is noted that during the forward stroke, with the rotor operating at a relatively low speed of 600 r.p.m., there is relatively little cutting of the flux produced by magnet 26, so that little if any eddy currents are produced in the disc 56. It is also noted that when motor 10 is energized the magnetic flux due to coil 38 is during part of each cycle counteracting or cancelling the magnetic flux from permanent magnet 26. Thus, the permanent magnet can be incorporated into the otherwise conventional power device without adversely affecting its performance during the motor energization periods.

The aforementioned discussion has necessarily centered on a concrete embodiment of the invention, but it will be appreciated that variations and modifications of the illustrated embodiment may be resorted to without departing from the spirit of the invention as set forth in the appended claims.

What is claimed:

1. In the control of a power device wherein a magnetizable rotor is moved in a forward direction at relatively slow speed by energization of a field coil and in the reverse direction at relatively high speed by a storable energy power means which has been progressively loaded during the forward direction movement: the improvement comprising magnetic means for producing a drag on the rotor during the reverse direction movement; said rotor comprising a non-magnetic, electrically-conductive disc; and said magnetic means comprising a permanent magnet located adjacent one face of the disc and a pole piece for the field coil located adjacent the other face of the disc.

2. The combination of claim 1 wherein the permanent magnet and pole piece comprise annular portions of approximately the same diameter arranged so that the facing surfaces thereof are in approximate axial registry with one another.

3. In a power device: the combination comprising a synchronous motor having a field coil and a rotor movable at a relatively slow speed upon energization of said coil; an output member arranged to be driven in one direction by the rotor during energization of the coil; storable energy power means acting on the output member and rotor to drive the output member and rotor at a relatively fast speed in the reverse direction when the coil is de-energized; said rotor comprising a non-magnetic, electrically-conductive member; and a magnet arranged adjacent the electrically-conductive rotor member to produce eddy currents therein during the reverse direction movement so that the storable energy power means operates the output member at a lesser speed than would be the case if the permanent magnet were not present.

4. In a power device comprising a synchronous motor having a field coil, and a rotor which includes a magnetic portion and a non-magnetic electrically conductive portion; an output member arranged to be driven by the rotor in one direction upon energization of the coil; and storable energy power means acting on the output member and rotor to drive the output member in the reverse direction when the coil is de-energized, said storable energy power means being operable to drive the rotor at an appreciably greater speed than the field coil: the improvement comprising a permanent magnet arranged adjacent the electrically conductive portion of the rotor to produce eddy currents therein during the reverse direction movement so that the storable energy power means operates the output member at a lesser speed than would be the case if the permanent magnet were not present.

5. In a power device: the combination comprising a synchronous motor having a field coil, fixed pole pieces, and a magnetizable rotor arranged adjacent the pole pieces for forward movement upon energization of the coil; said rotor comprising a magnetic member and a non-magnetic electrically-conductive member; an output member mechanically connected with the rotor for movement in one direction when the coil is energized; storable energy power means arranged to reverse the motions of the output member and rotor when the coil is de-energized: said storable energy power means being effective so that the reverse movement rotor speed is appreciably greater than the forward movement, a permanent magnet arranged adjacent the electrically conductive rotor member in close proximity to one of the pole pieces so that when the field coil is de-energized magnetic flux from the magnet passes through the rotor and said one pole piece, whereby eddy currents are created in the rotor, thus causing the rotor to move at a lesser speed than would be the case if the permanent magnet were not present.

6. In a power device: the combination comprising a synchronous motor having a field coil, pole means including a magnetic member having a disc portion arranged adjacent one end of the coil, and a rotor comprising a non-magnetic electrically conductive disc portion located closely adjacent the disc portion of the magnetic member; an output member operatively connected with said rotor for movement in one direction when the field coil is energized; storable energy power means for driving the output member in the opposite direction when the field coil is de-energized; said storable energy power means being effective to drive the rotor at an appreciably greater speed than the field coil; and a magnet fixedly arranged adjacent the rotor disc portion and magnetic member disc portion so that magnetic flux from the magnet passes through the electrically conductive rotor disc portion into the magnetic member disc portion during the aforementioned reverse movement, whereby speed-retarding eddy currents are set up in the rotor.

7. In a power device: the combination comprising a synchronous motor having a field coil, a core extending within said coil, pole pieces including magnetic disc portions radiating from opposite ends of said core and having pole elements arranged about the coil periphery to define magnetic gaps therebetween, and a rotor including an electrically conductive non-magnetic disc arranged adjacent the radiating disc portion of one of the pole pieces and a magnetizable ring extending from the rotor disc periphery within the magnetic gaps whereby to effect rotation of the rotor when the field coil is energized; a casing for said motor including a cover element located adjacent one face of the rotor disc; an output member operatively connected with the rotor for movement in one direction when the field coil is energized; storable energy power means operatively connected with the output member to be progressively loaded as the member is moving in said one direction, whereby when the field coil is de-energized the power means is enabled to move the output member in the reverse direction; said storable energy power means being effective to drive the rotor at an appreciably greater speed than the field coil; and a permanent magnet carried on the cover adjacent the rotor disc so that when the field coil is de-energized the flux generated by the magnet is enabled to produce eddy currents in the rotor which retard the rotor in its movement.

8. The combination of claim 7 wherein the magnet and said one pole piece disc portion are annular structures of approximately the same diameter so that the facing surfaces thereof are in approximate axial registry with one another.

References Cited by the Examiner
UNITED STATES PATENTS

| 2,630,466 | 3/53 | Landis | 310—93 |
| 2,904,956 | 9/59 | Zenor | 60—7 |
| 2,913,605 | 11/59 | Johnson | 310—93 |
| 2,919,500 | 1/60 | Simpson et al. | 310—93 X |

EDGAR W. GEOGHEGAN, *Primary Examiner.*
JULIUS E. WEST, *Examiner.*